United States Patent [19]

Tischer

[11] 4,184,560
[45] Jan. 22, 1980

[54] TWO-CIRCUIT STEERING ARRANGEMENT FOR MOTOR VEHICLES

[75] Inventor: Werner Tischer, Boebingen, Fed. Rep. of Germany

[73] Assignee: Zahnradfabrik Friedrichshafen AG, Friedrichshafen, Fed. Rep. of Germany

[21] Appl. No.: 935,947

[22] Filed: Aug. 23, 1978

[51] Int. Cl.² ............................................. B62D 5/08
[52] U.S. Cl. ............................................. 180/133; 60/405; 60/420; 180/152
[58] Field of Search ................. 180/133, 152, 153; 60/405, 420, 486

[56] References Cited

U.S. PATENT DOCUMENTS

| 3,692,138 | 9/1972 | Witt | 180/133 |
| 4,114,720 | 9/1978 | Ericson et al. | 180/133 |

FOREIGN PATENT DOCUMENTS

1555198 2/1970 Fed. Rep. of Germany ............. 60/405

Primary Examiner—John A. Pekar
Attorney, Agent, or Firm—Zalkind & Shuster

[57] ABSTRACT

Two fluid circuits respectively supply pressurized fluid from engine driven and vehicle pumps to separate servomotors in a vehicle steering system for steering operation during vehicle travel. Both fluid circuits are connected to the engine driven pump alone during vehicle standstill by a reversing valve which is shifted to a travel position by pressure output of the vehicle driven pump.

3 Claims, 1 Drawing Figure

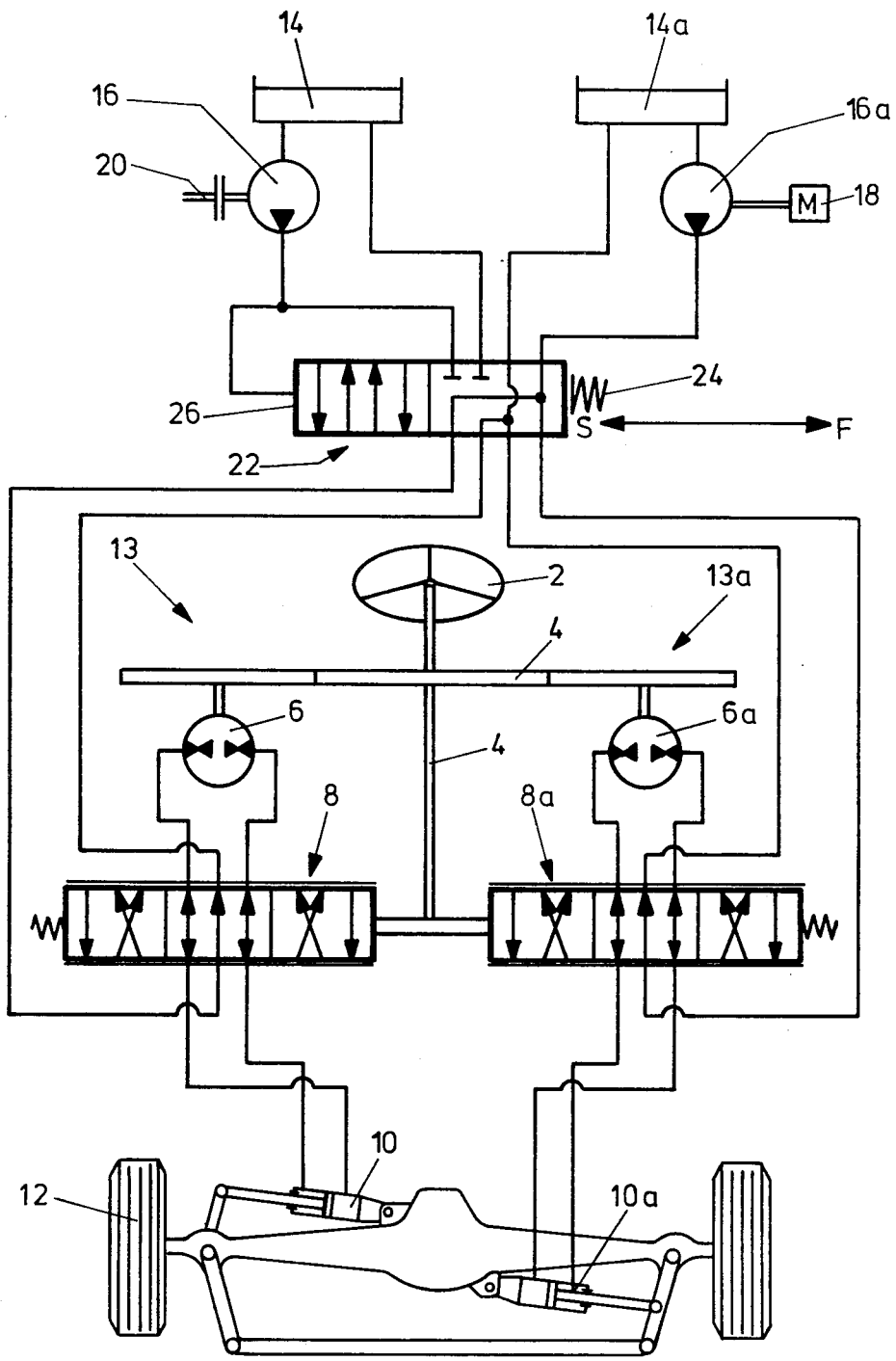

TWO-CIRCUIT STEERING ARRANGEMENT FOR MOTOR VEHICLES

Cross reference is made to the following patent applications:

Ser. No. 918,422, filed by Erich Jablonsky on June 23, 1978, for: Auxiliary Power Steering for Motor Vehicles;

Ser. No. 923,679, filed by Karl-Heinz Liebert on July 11, 1978, for: Hydrostatic Two-Circuit Steering Arrangement;

Ser. No. 923,682, filed by Erich Jablonsky on July 11, 1978, for: Auxiliary Power Steering for Motor Vehicles.

BACKGROUND OF THE INVENTION

This invention relates to a two-circuit steering system for motor vehicles, especially those systems in which a mechanical linkage connection is provided between the hand steering wheel and the steered parts of the vehicle with an auxiliary fluid power assist associated therewith. The invention is also applicable to those hydrostatic steering systems wherein a linkage connection is omitted and the steering forces are transmitted solely by fluid. The foregoing vehicle steering systems include hand and metering pumps which act in concert with a high pressure pump as a fluid metering arrangement and, in the event of high pressure pump failure, act as hand pumps.

A two-circuit steering system having a high pressure pump is already known. In such a system, steering maneuverability is lost as soon as the high pressure output of the pump is interrupted. In order to cope with this problem, two separate high pressure pumps have been proposed in a system wherein both pumps are driven by the vehicle engine. Whenever the engine fails during travel of the vehicle, drive of the high pressure pump is lost. Consequently, the hand and metering pumps associated with the steering system then act as hand pumps which must be operated solely by muscular power of the vehicle driver. The heavier the vehicle, the more power must, in such case, be expended by the driver for steering purposes. In case of a very heavy vehicle, effective steering is not possible.

SUMMARY OF THE INVENTION

According to the present invention, a two-circuit steering system for motor vehicles is provided wherein the two steering circuits are maintained entirely separate from one another during vehicle travel and yet maintain maneuverability of the vehicle even if engine failure occurs. While two high pressure pumps are provided for respectively supplying fluid to the two steering circuits, one of the high pressure pumps is not operated by the vehicle engine but is driven by at least one of the vehicle wheels. High pressure fluid is therefore always available during travel of the vehicle for at least one of the steering circuits. So that both steering circuits may be operated during standstill of the vehicle, a reversing valve is biased to one position in which it connects both circuits to the engine driven high pressure pump. The reversing valve is actuated by pressurized fluid from the vehicle driven high pressure pump as soon as the motor vehicle moves to produce a sufficiently high output pressure in order to separately supply the two circuits from the high pressure pumps independently of each other.

Heretofore in a two-circuit system, only one of the steering circuits is relied upon during vehicle standstill. Therefore, the capacity of just one steering circuit must be about twice as high as that required for steering operation during vehicle travel when both circuits are operative to meet the steering requirements. The present invention now makes it possible to design the two steering circuits so as to meet the requirements of only steering operation during vehicle travel. During standstill of the vehicle, both steering circuits are fed from the same engine driven high pressure pump, in accordance with the present invention, to establish the two-circuit system heretofore established only during vehicle travel.

BRIEF DESCRIPTION OF DRAWING FIGURE

An embodiment of a two-circuit steering system according to the invention is described hereinafter on the basis of the accompanying drawing, the only FIGURE of which shows this embodiment schematically.

DETAILED DESCRIPTION OF THE PREFERRED EMBODIMENT

Referring now to the drawing in detail, a hand steering wheel 2 is shown drivingly connected by a mechanical driving connection 4 to two separate hand and metering pumps 6 and 6a. These pumps are operated by the hand wheel 2 against the bias of return springs (not shown) and conduct pressurized fluid through control valves 8 and 8a in the desired sense of direction to actuate two servomotors 10 and 10a which act on the steered wheels 12 of a motor vehicle. Two separate steering circuits 13 and 13a are associated with the foregoing arrangement which is generally well known in the art.

Two fluid reservoirs 14 and 14a for the operating fluid are provided. A first high pressure pump 16a draws fluid from the first reservoir 14a and is driven by the engine 18 of the motor vehicle. The capacity of pump 16a is such that it meets the functional steering requirements of both steering circuits 13 and 13a during standstill of the vehicle. A second high pressure pump 16 is driven by the vehicle through a mechanical driving connection 20 to an axle of the vehicle for example. The second high pressure pump need only have a capacity to produce the power necessary for operation of one steering circuit 13 during travel of the vehicle.

A reversing valve 22 is held by a return spring 24 in a rest position as shown when the vehicle is at a standstill. In this rest position, the reversing valve 22 connects the outlet of the engine driven pump 16a to both steering circuits 13 and 13a in parallel. During travel of the vehicle, the second high pressure pump 16 is driven. The output pressure of pump 16 acts on an operating face 26 of the reversing valve 22 to displace it against the bias of return spring 24 to a travel position. In this travel position of reversing valve 22, both steering circuits 13 and 13a are respectively connected independently of each other to high pressure pumps 16 and 16a so that a complete two-circuit system is established.

What is claimed is:

1. In a fluid steering system for a motor vehicle having an engine (18), including two steering circuits (13 and 13a), wherein each of the circuits has an reservoir (14, 14a) for operating fluid, a high pressure pump (16, 16a), a manually driven pump (6, 6a), a control valve (8, 8a), and a servomotor (10, 10a) operated by said pump, said high pressure pumps being respectively driven by the engine and the vehicle travel, the improvement residing in reversing valve means (22) for disconnecting the vehicle driven high pressure pump (16) from the control valve (8) associated therewith during standstill of the motor vehicle and connecting the engine driven pump (16a) to both of the control valves, and means responsive to a predetermined output pressure from the vehicle driven high pressure pump during travel of the vehicle for displacing the reversing valve means to a travel position connecting each of the two high pressure pumps with its respective control valve.

2. In the system as defined in claim 1 wherein the engine driven high pressure pump (16a) is of a relatively high capacity meeting steering requirements during standstill through both of the steering circuits, while the vehicle driven high pressure pump (16) is of a relatively low capacity for meeting steering requirements during vehicle travel through one of the steering circuits (13).

3. In a fluid steering system for a vehicle having an engine (18), servomotors (10 and 10a), and two fluid steering circuits (13 and 13a) for separately supplying pressurized fluid to the servomotors from a respective one of 9 pair of pumps (16 and 16a), each fluid steering circuit including manually operated flow control means (6-8, 6a-8a), the improvement residing in separate drive means for respectively driving said pumps by the vehicle engine and the vehicle travel, a reversing valve (22) biased to a position connecting one of the pumps (16a) to both of the fluid steering circuits in parallel for standstill steering operation and means (26) responsive to operation of the other of the pumps (16) during vehicle travel for displacing the reversing valve to a travel position establishing said separate supply of fluid from the pumps to the servomotors through both of the fluid steering circuits.

* * * * *